Dec. 19, 1939. E. B. WILFORD Re. 21,306

AIRCRAFT

Original Filed July 17, 1933 2 Sheets-Sheet 1

BEST AVAILABLE COPY

Inventor:
Edward B. Wilford,
By Frank H. Borden
Attorney.

Dec. 19, 1939. E. B. WILFORD Re. 21,306

AIRCRAFT

Original Filed July 17, 1933 2 Sheets-Sheet 2

INVENTOR:
Edward B. Wilford,
BY Frank H. Borden
ATTORNEY.

Reissued Dec. 19, 1939

Re. 21,306

UNITED STATES PATENT OFFICE 21,306

AIRCRAFT

Edward Burke Wilford, Merion, Pa.

Original No. 2,068,616, dated January 19, 1937, Serial No. 680,694, July 17, 1933. Application for reissue May 6, 1938, Serial No. 207,407

14 Claims. (Cl. 244—18)

This invention relates to aircraft, and particularly to gyroplanes.

In certain types of aircraft as provided in the past, there have been utilized combinations of both rotary and fixed wing systems. However, this conjoint use of the past was due to a necessary compromise whereby ailerons and the like were mounted upon fixed wings, to furnish the controlling movements not obtainable from the rotating wing system. The fixed wing was also of sufficient area as to keep the rotative speed of the rotor susbtantially constant by assuming perhaps 20% of the load in forward flight. The conjoint use of the past, however, simply aggregated the disadvantages of each system to militate against any advantages inherent in either system alone.

In considering the problems of gyroplanes it must be recognized that there are two principal conditions to which the device must be responsive. First, to forward flight, and, second, to vertical movement with or without forward movement. These conditions and combinations thereof are found in climbing, flying level and cruising, and in descending.

In gyroplanes of the past the major load has been disposed upon the rotor under all service conditions, and this has resulted in the creation of such drag in the rotating wing system as to seriously affect the maximum forward speed of the aircraft, and owing to the fact that the only control system was disposed on the fixed wing has required forward movement to secure control. Any condition of direct descent, for instance, without forward movement has found the aircraft to be out of control. This has effected a sharp limitation on the speed range of gyroplanes of the past, and has provided inefficient control thereof.

For certain purposes it is of considerable moment that in the gyroplane of this invention there should be control in the rotary wing system itself in synchronism with the normal control surfaces of the aircraft, such as ailerons upon the fixed wing system. While there may be considerable variation in the types of rotor control that are utilized, it is preferred for some purposes to use a rotor control such as is disclosed and claimed in Rieseler and Kreiser application Ser. No. 479,037. A specific hookup or connection of the rotor control and conventional control surfaces of an aircraft is disclosed and claimed in an accompanying application now in course of preparation, which will be understood to be incorporated in the gyroplane according to the instant invention. As will be pointed out in the conjoint use of two distinct control systems in connection with the conjoint use of two distinct supporting systems provides a gyroplane which is always under perfect control regardless of the presence or absence of forward speed.

It is among the objects of this invention; to provide a gyroplane with both rotary and fixed wing systems, and arranged selectively to dispose the major part of the load upon either the rotary or the fixed wing system; to provide an airplane with a rotating wing system such that the latter can be used for supporting the major load during descent, but to be relieved of its major load during forward flight; to provide aircraft having a rotating and a fixed wing system in which the load can be carried upon the fixed wing to unload the rotor, whereupon the speed of rotation of the rotor can decrease with safety and with reduction of its drag to such minimum as to have substantially no adverse effect upon the forward speed of the whole; to provide a substantially rigid rotor the speed of which can be raised or lowered without collapse thereof, with a fixed wing such that the load can be substantially shifted from the rotor to the wing and from the wing to the rotor, with a consequent utilization of the most efficient factors of each; to combine in an aircraft a rotary and a fixed wing and control system in which the favorable factors of each are present as and when desired, thus that the low L/D of the rotary system furnishes the lift for safe and slow descent with positive control, and the fixed wing system furnishes the high L/D for rapid forward flight with normal control, with the rotor flying "on edge" to reduce its rotative speed and its minimum drag to secure a high ratio between maximum lift and minimum drag of the aircraft as a whole; to provide a rudder on an inclined axis such as to give rudder controlling actions to turn the aircraft about a substantially vertical axis when the aircraft is moving either directly horizontal or directly vertical as well as on intermediate flight paths; to provide a safe and useful multimotored aircraft with roomy body and comfort to the passengers with a rotor for descent and take off in restricted areas, and with a fuselage of airfoil contour which may or may not be combined with a small fixed wing, for unloading the rotor in forward flight to secure efficient performance; and many other objects and advantages as will become more apparent as the description proceeds.

Figure 1:
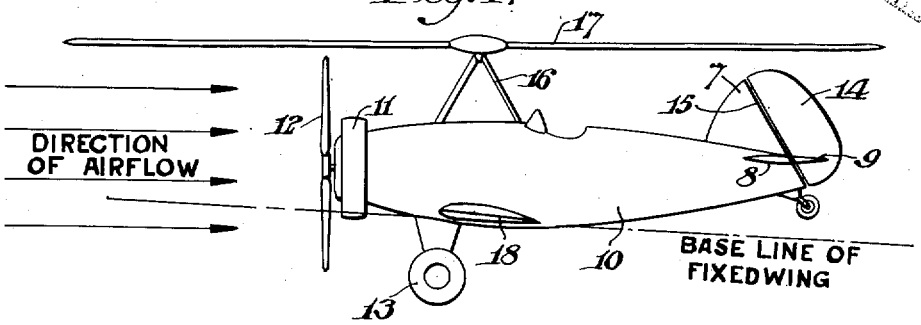
Fig. 1 represents an elevation of the aircraft of this invention in normal forward flight relative to the indicated direction of air flow, and in which the rotor has been "unloaded" and is "idling", with the major load on the fixed wing.
Figure 3:
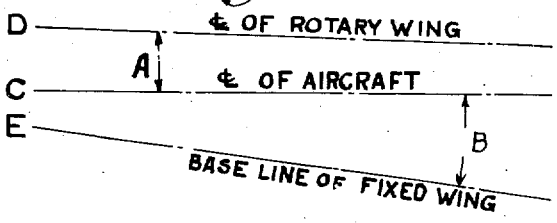
Fig. 3 represents a diagrammatic illustration of the relative angles of the component parts of the aircraft to secure favorable results according to this invention.

Referring to Figs. 1 and 3 a purely illustrative form of the invention is disclosed in which a fuselage 10 having a longitudinal axis as line C of Fig. 3, has a motor or power plant 11, propeller 12, landing gear 13, and a rudder 14 disposed to swing upon the inclined axis 15 found on the trailing edge of fin 7 so as to give rudder controlling actions during direct vertical motions of the aircraft about substantially vertical axes of the aircraft in either horizontal or vertical movements of the aircraft. The advantages and operation of the rudder 14 will be obvious. The fuselage may also carry a horizontal fin 8 and elevator control surface 9.

Suitably supported upon a pylon 16 is a rotor or rotating wing system 17 lying substantially in an average plane D (Fig. 3), having a substantially vertical axis of rotation, perpendicular to the average plane of system 17 and preferably substantialy perpendicular to the longitudinal axis C of the fuselage 10. While there may be other forms of rotary wing systems or rudders used in connection with this invention, yet for illustrative and explanatory purposes the type of wing system shown in Rieseler and Kreiser reissue application No. 545,362, or in my co-pending application Ser. No. 478,990 or in my co-pending application Ser. No. 571,946, or the like may be used, the only essential in the rotor according to this invention being that it hold its position, substantially regardless of centrifugal force. For illustrative purposes the rotor 17 will be considered to include a pair of blades or wings 19, oscillatable on an axis 20 to equalize the effective lift on opposite sides of the rotor, as well as to predeterminedly vary the effective lift so as to secure desired pretermined controlling moments by some such mechanism as is hereinafter described in connection with Fig. 4. While the rotor 17 is preferably arranged for aerodynamic rotation when the relative airstream strikes the rotor at proper angles, yet it is also so arranged as to decelerate to a condition of slow rotation owing only to "profile" drag, when the relative airstream strikes the rotor at small angles. This slow rotation is due purely to the fact that the advancing airstream exerts more drag on the trailing edge of a blade than on the entering edge thereof. It is preferred that the rotor be permitted to rotate slowly at small angles of attack, during which, obviously, there is no lift available from the rotor, or the rotor may be caused to come to a complete stop and be held against any sort of rotation depending upon which procedure attains the minimum of drag and trouble.

It is a feature of importance that control of the aircraft be derivable from the rotor, as in accordance with the Rieseler and Kreiser application Ser. No. 479,037 or in accordance with the companion application co-pending herewith, so that rolling and pitching controlling moments may be secured for the aircraft from the rotor regardless of the presence or absence of forward speed. As noted, such control system will be described later herein. As a further alternative, but less desirable type of control, that may be utilized in the connection, it is contemplated that the rotor 17 may be universally mounted on the pylon 16 in such manner that its axis of rotation may be predeterminedly shifted to control the attitude of the aircraft.

For general purposes it may be assumed that the axis of rotation of the rotor system 17 is substantially perpendicular to the longitudinal center line C of the fuselage, as a more or less permanent relationship, as this is preferred, and control will be derived from changing positions of the blades, and the shifting of the vertical axis of the rotor will be the alternative modified procedure.

Mounted on the fuselage 10 is the relatively fixed wing 18, the base or datum line E (Fig. 3), of which is angularly divergent from the longitudinal axis C of the fuselage. At least it is in non-parallel relation to the plane of the rotary wing system or to the general or average plane of a coning rotary wing system, and to the longitudinal axis of the aircraft, but the degree of angular divergence will depend upon conditions encountered in the particular rigging, etc., of the aircraft in question. or purely illustrative and not limitative purposes the base or datum line E, of the relatively fixed wing 18, diverges angularly from the longitudinal axis C, and from the plane or general or average plane substantially perpendicular to the axis of rotation of the rotary wing system by substantially 4°. That is, such setting has been found satisfactory in one device, but obviously may be greater or smaller than that angle. It is a feature of refinement or increased efficiency that the wing 18 be arranged for adjustment about axes lateral of the fuselage so that this initial angular setting may be varied, either upon the ground or in flight. As diagrammatically illustrated in Fig. 2, the inner end of the wing 18 may be engaged by the lower end of the rotatable shaft 2 actuated by the crank handle 1 turning the shaft in the pivoted nut element 3 of the supporting member 4 so as to provide for manually raising and lowering the trailing edge of wing 18 about a pivot longitudinal of the wing and disposed between the entering and the trailing edges. Wing 18 may carry ailerons 21.

Figure 2:
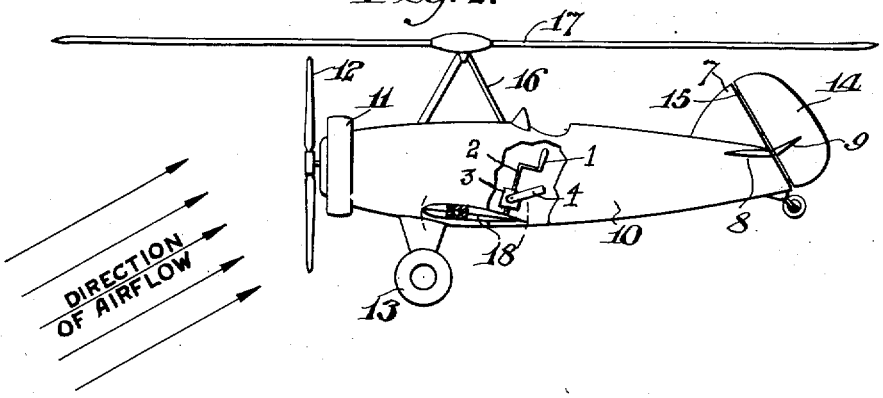
Fig. 2 represents a similar elevation in which the rotor speed has increased, and the major load is on the rotor and the aircraft is ascending or descending.
Figure 5:
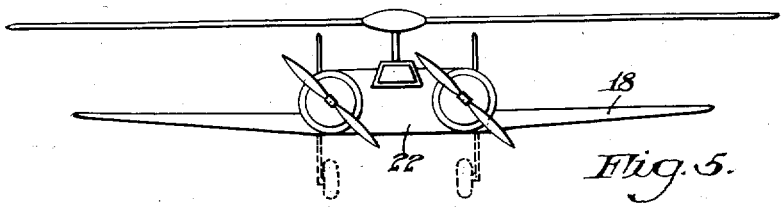
Fig. 5 represents a front elevation of a modified form of the invention herein utilizing a fuselage of airfoil contour.
Figure 6:
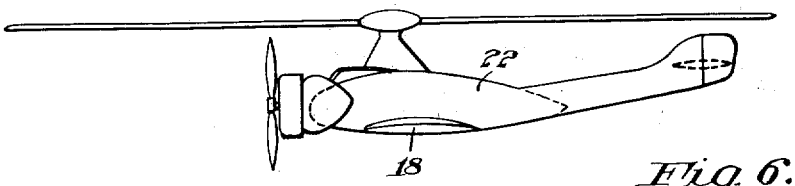
Fig. 6 represents a side elevation of the same.

It is a further possibility, as a modified form of this invention, that the fuselage 10, instead of the conventional form illustrated in Figs. 1 and 2 may be of the airfoil profile or "Burnelli" type as shown at 22, in Figs. 5 and 6, and may therefore function either in whole or in part as the fixed wing system by which some or all of the load of the aircraft may be carried when the rotor is "unloaded." In this just described modified form it is preferred that the fixed wing 18 be of reduced span and area, and may be provided at any vertical position on, and, in addition to the airfoil fuselage to form a low, middle, or high wing monoplane, if a monoplane is to be utilized. It will be clear that effective results can be had from a plurality of fixed wings, if preferred, in any embodiment of this invention.

Figure 4:
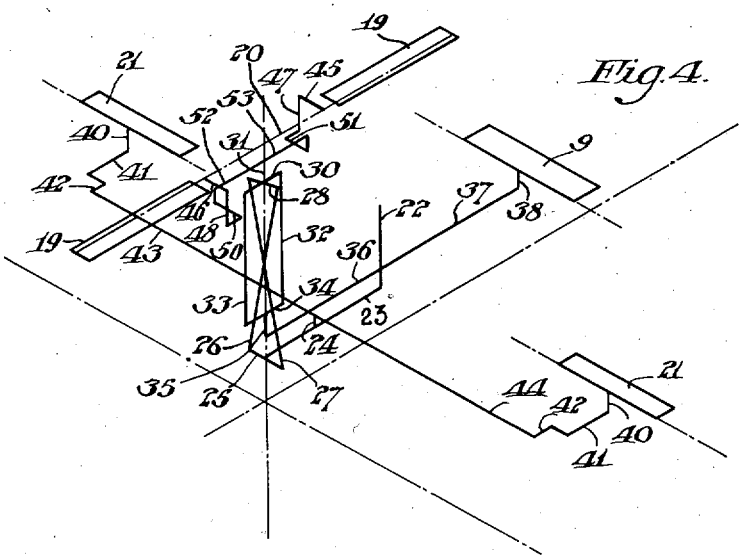
Fig. 4 represents a diagrammatic disclosure of the coupled synchronized control systems for the rotor and the ailerons and elevator of the aircraft, such as is available to enhance the utility of the invention.

As pointed out in the noted co-pending application, there may be many modifications of the synchronous controlling systems, and that which is diagrammatically shown in Fig. 4 is to be considered as purely illustrative. A master control device as stick 22 is provided suitably pivoted as at its lower end (for instance) on a transverse pivot in horizontal rock shaft or torque tube 23, which carries perpendicular lug 24 and transverse rotor rock shaft 25, the ends of which are pivotally engaged by the crossed links 26 and 27, in turn pivotally engaging with the substantially universally pivoted device indicated by the intersecting lines 28 and 30 carrying the substantially vertical rotor control member 31. The pivoted device 28, 30 is also pivotally engaged by links 32, 33, pivotally engaging the free ends of a T-shaped compound bell crank lever 34, the depending arm 35 of which is pivotally engaged by the link 36 pivoted to the control stick 22. A link 37 engages with a horn or the like 38 of the elevator surface 9 and with control stick 22. The ailerons 21 have actuating horns 40, engaged by links 41, pivoted to bell crank levers 42, the opposite ends of which connect with transverse links 43 and 44 pivoted to the lug 24 on rock shaft 23.

The rotor 17 is comprised of as many blades as desired, of which for purely illustrative purposes, two are shown at 19, in Fig. 4, mounted for oscillation about the axis 20, and the angular position of which is controlled by the linkage to the control member 31, the angular position of which relative to the vertical, or to the axis of rotation of rotor 17, is variable according to pull on the links 32, 33, and 26, 27. Such control may be secured as desired, but in the illustrative disclosure comprises a control horn or lug 45, the position of which determines the position of one blade 19, and a control lug or horn 46 operatively associated with and controlling the position of the other wing or blade 19, with mechanism comprising links 47 and 48, bell crank rock shafts 50 and 51, and links 52 and 53 engaging vertical control member 31. It will be understood that a single movement of master control device 22 in a generally fore and aft line, simultaneously actuates elevator 9, as well as the rotor control member 31 in such manner as to secure pitching moments from the respective blades 19 at the same time as such pitching movements are secured from the elevator 9 if the relative forward speed is sufficiently high. Obviously also, lateral movements of master control 22 simultaneously actuate ailerons 21, and also rotor control member 31 so as to secure lateral rolling moments from the respective blades 19 if the rotor speed is sufficiently high. Compound control stick movements obviously secure compound synchronized controlling movements as will be clear.

The important thing is that synchronized controlling movements are secured although the one that is most effective depends entirely upon relative forward speed or its absence.

With the aircraft of this invention disposed as in Figs. 1, 5 and 6, with the relative airstream moving parallel or substantially parallel to the longitudinal axis of the aircraft, there will be substantially zero or at least such small angles of attack of the rotating wing system 17 that it may decelerate to idling condition, and with a consequent substantial failure to assume any appreciable part of the load. This angular disposition, however, finds the fixed wing, whether wing 18, fuselage 10 or 22, or both wing 18 and fuselage 22, at favorable angles of attack or incidence such as to maintain the efficient load supporting horizontal flight at cruising or high speeds and with such high efficiency as such fixed wing systems may attain, except for such decrease as is due to the relatively small profile drag by which the rotor is kept idling, or which the rotor exerts when held against rotation. At this time the dual control, namely, the rotor control and conventional control system including ailerons on the wing 18, are being actuated by the pilot but no controlling moments are available from the rotor, although high efficiency in control is available from the fixed wing and tail control surfaces during this time.

If the speed of the aircraft should diminish so as in effect to change the angle of incidence thereof, or if through actuation of control surfaces the actual angle of attack of the aircraft should be changed, as, for instance, toward a climb, the relative airstream would change its angle relative to the average plane of the rotor system 17 so that its relative motion would cause aerodynamic acceleration of the idling rotor 17 to cause it to generate such lift as to begin to assume the load of the aircraft. Owing to the rigidity of the rotor system 17 and to the fact that its position is maintained substantially regardless of its rotative speed, the application of the load to the rotor causes simply an acceleration in its rotation, and not its collapse, and the only deterrent factor militating against instantaneous assumption of the load is the inertia in the system. During this period of change of effective angle of attack of the aircraft, the angle of incidence of the fixed blade 18 has obviously been increased so that there has been an increase in drag from the fixed wing 18 but there has been also an increase in its lift and at this time the load is carried by both the rotor and fixed wing systems. It might be observed that the "down wash" from the rotor system 17 is helpful in keeping the lift of the wing 18 at an efficient point even after the angle of the wing 18 to the relative airstream has increased beyond what would otherwise be the "burble point" thereof. During this time of support of the load upon both the rotor and fixed wing systems, it will be clear that the controlling moments of the aircraft are derivable from both the rotor and the fixed wing and conventional controls.

With a further effective increase in the angle of the relative airstream and the aircraft, such for instance as a complete loss of forward speed, the vertical descent of the aircraft finds the rotary wing system 17 assuming substantially all of the load while the upwardly moving relative airstream eddying about the fixed wing 18 has substantially only a drag coefficient, which, however, being vertical imparts effective lift to retard the descent. During this interval the control of the aircraft is derivable solely from the rotary wing system 17.

It will be clear that the rudder 14, working on its inclined axis 15 will be able to generate moments about the vertical axis of the aircraft during all conditions of flight from purely vertical to purely horizontal.

It will be clear that with this invention the only time the undesirable characteristics of the fixed wing are present and noticeable, such as drag and inadequate control at high angles and slow or no forward speed, is when the rotor is loaded, and no lift is needed from the fixed wing and adequate control is available from the rotor per se. On the other hand, for cruising, the high drag factor of the rotating wing system is eliminated and rendered practically unnoticeable, by unloading the rotor and permitting the rotor to reduce its speed of rotation to that occasioned only by the profile drag of the system. While, as noted, the rotor may be arrested in rotation yet it is preferred that it be simply slowed down so that the reduced speed of rotation is just enough to keep the rotor in condition to assume the load and to speed up when it is called upon.

It will be evident to those skilled in the art that the relative areas of the rotary and fixed wing system have an important bearing upon the success of the invention, each being so set as to furnish enough lift to take its load at the angle of best compromise for high and low speeds so that the areas and angles are so proportioned as to secure the best results.

The existence of the synchronous control system in both the rotary and fixed wing systems bridges the problem of control under varying conditions of forward flight, and the result is not only a high safety factor, owing to complete control at all speeds but also of a high speed range for the aircraft.

It is pointed out further as a fundamental object of the invention in gyroplanes that the provision of a fixed wing system as auxiliary to and complemental of the rotary wing system and of such relative area and relative angle as to assume the major load, is for the further purpose of permitting the rotative speed of the rotary wing system sharply to diminish whereas fixed wings of the past have only assumed small portions of the load and the object was simply to prevent the rotative speed of the rotary wing system from increasing or decreasing. In a rotor which is acting in auto-rotation and supporting a load, the rotative speed varies substantially as the square root of the load, and only very slightly, say not over 20% with maximum possible variation in the forward speed, so that in a gyroplane equipped with a fixed wing system the assumption of the load by the fixed wing system has the direct effect of reducing the revolutions or rotative speed of the rotor. As used heretofore, the combination of fixed and rotary wing systems has been for the sole purpose of keeping the rotor speed substantially constant, by nullifying the slight variation in rotor speed incident to variation in air speed. Obviously the objects sought and results obtained are radically different.

I claim:

1. In aircraft, a stationary wing system, a normally aerodynamically driven rotor of a substantially fixed coning angle in which part at least of the thrust load is carried by moments in the spars and in which the revolutionary speed varies as the load carried thereby relative to that of said fixed wing, the stationary wing system so set that the no-lift line thereof is angularly rearwardly divergent from the substantial plane of said rotor, the whole so constructed and arranged that when the craft is flow in its higher speed range a considerable portion of its load is carried on the fixed wing system and the rotor is at such an angle that the autorotative speed and hence the rotor drag is materially and safely reduced, and whereby efficient high speed flight is enhanced.

2. In aircraft, a rotor having blades the coning angle of which is substantially independent of the disc loading and which angle is also substantially independent of rotative speed, a fixed wing system so set that its no-lift line is rearwardly downwardly divergent from the average plane of the rotor, the whole so constructed and arranged that when the craft is flown with the fixed wing carrying the major part of the load in high speed flight the rotor is at such an angle that the loading of the rotor is materially and safely reduced, and so arranged that when flown at such an angle of attack and speed that the load on the fixed wing is substantially reduced in its slower speed range a considerable portion of the load is shifted safely from the fixed wing system to the rotor, whereby the drag is reduced in high speed flight.

3. In aircraft, a normally aerodynamically driven rotor of substantially fixed coning angle in which the revolutionary speed varies directly as the load carried by the rotor, a stationary wing system whose no-lift line is set so as to be rearwardly downwardly divergent from the substantial plane of the rotor, the whole being so constructed and arranged that at the higher speeds and high angles of attack a considerable portion of the aircraft load is carried by the fixed wing system while the remaining portion of the load is carried by the rotor which consequently has a slower rotative speed and reduced drag and so arranged that at slow speeds and high angles of attack the rotor safely assumes and supports a considerable portion of the load, whereby the drag is reduced at higher speeds.

4. In aircraft, a normally aerodynamically driven rotor having blades which are cantilever and substantially non-flapping and in which the principal part of the thrust load of the rotor is carried by bending moments in the spars and in which the revolutionary speed varies directly as the load carried by the rotor, a stationary wing system whose no-lift line is set so as to be rearwardly downwardly divergent from the average plane of the rotor, the whole so constructed and arranged that when the craft is flown at such an angle that the major load is carried on the fixed wing system the rotor is at such an angle that the autorotative speed is materially reduced and hence its drag is low.

5. In aircraft, a normally aerodynamically driven rotor having blades the coning angle of which is substantially independent of disc loading, a fixed wing system so set that its no-lift line is rearwardly downwardly divergent from the plane of the rotor, the whole so constructed and arranged that when the craft is flown at its higher speeds the major part of the total load is carried on the fixed wing system and the rotor is at such an angle that the loading of the rotor is materially and safely reduced so that its speed is materially decreased to reduce the drag thereof, whereby the drag is decreased in high speed flight.

6. In aircraft, a normally aerodynamically driven rotor having blades, the coning angle of which is substantially independent of disc loading, a fixed wing system so set that its no-lift line is rearwardly downwardly divergent from the substantial average plane of the rotor, the whole so constructed and arranged that when the craft is flown at its higher speeds the major part of the total load is carried on the fixed wing system and the rotor is at such an angle that the loading of the rotor is materially and safely reduced so that its speed is materially decreased to reduce the drag thereof, and so that when flown in its slower speed range the major part of the total load is shifted safely from the fixed wing system to the rotor, whereby in high speed flight the drag is reduced.

7. In aircraft, a rotor in which part at least of the thrust load is carried by the spars acting as cantilever beams and in which the revolutionary speed varies as the proportion of the total load carried thereby, a stationary wing system so set that no-lift line thereof is downwardly rearwardly divergent from the substantial plane of said rotor, the rotor and fixed wing system being so constructed and arranged as alternatively selectively to support an appreciable part of the total load on either the rotor or fixed wing system, whereby drag at high speeds can be safely reduced.

8. In aircraft, a normally aerodynamically driven rotor having blades the coning angle of which is substantially independent of rotative speed, a fixed wing system so set that its no-lift line is rearwardly downwardly divergent from the average plane of the rotor, the rotor and fixed wing being so constructed and arranged as alternatively selectively to support the major load part of the total on either rotor or fixed wing system, whereby drag at high speeds can be safely reduced.

9. In aircraft, the feathering normally aerodynamically driven rotor in which the major thrust load of the rotor is carried by bending moments in the spars which are supported as cantilever beams and in which the revolutionary speed varies directly with the imposed proportion of the total load, means for selectively feathering the blades of the rotor for control purposes, a fixed wing system including ailerons and an elevator, means for selectively actuating the ailerons and elevator for control purposes, the fixed wing system being so set relative to the average substantial plane of the rotor as to have its no-lift line form a rearwardly divergent angle, the whole so constructed and arranged as alternatively and selectively to support the major load on either the rotor or wing system, whereby drag at high speeds can be safely reduced, and a common control operatively associated with both said last mentioned means to actuate said rotor control means and fixed wing system control means so as to secure an effective control substantially proportionally on the rotor or wing system that is carrying the major load.

10. In aircraft, a rotor having blades the coning angle of which is substantially fixed and is substantially independent of disc loading, a fixed wing so set that its no-lift line is rearwardly downwardly divergent from the substantial average plane of the rotor, means for securing stabilizing controlling functions from the rotor, means for securing stabilizing control functions from the fixed wing system, the whole so constructed and arranged that alternatively and selectively the major part of the total load can be carried upon either the fixed wing system or the rotor, and common means for actuating the said two stabilizing and controlling means so as to be effective proportionally substantially to the proportion of the total load carried by the rotor or fixed wing system.

11. In aircraft whose lifting surface comprises a normally aerodynamically driven rotary wing system and a fixed wing system, means for changing the angular relation between the two systems, control systems operative on both the fixed and rotary wing systems and a manual device for operating both control systems.

12. In an aircraft having power-driven means of propulsion adapted to effect a wide range of flight speeds, a main sustaining system of pivoted autorotatable wings mounted on a hub which is freely rotated by said wings in flight, a supplemental system of fixed wings, and fixedly pivoted control surfaces, said rotary wing system taking the major burden of the lift during vertical descent, said fixed wing system taking a progressively increasing proportion of the total lift with increase in forward speed, and control mechanism connected to pivoted parts of the rotor and to said pivoted control surfaces for conjoint operation of the rotary wings and said surfaces in controlling the craft throughout the range of flight speeds.

13. In an aircraft having power-driven means of propulsion adapted to effect a wide range of flight speeds, a plurality of oscillatably-movable autorotatable wings for sustention, a control system comprising movably mounted control surfaces secured to the craft in position to be of maximum effectiveness in high speed forward flight, a control system comprising said rotative wings and means arranged for effective shifting movements of the sustention thrust line with respect to the center of gravity of the craft and positioned to be fully effective for control purposes at minimum forward flight speed, and common control means connected to both of said systems for operating them in conjunction over the entire range of flight speeds, whereby maximum maneuverability is maintained under all flight conditions.

14. In an aircraft having power-driven means of propulsion adapted to effect a wide range of flight speeds, a plurality of autorotatable wings providing most of the lift at minimum flight speed and mounted by pivot means providing for oscillatable movements of the said wings, fixed surfaces positioned to assume a progressively increasing burden of the lift with increase in forward flight speed, a control system comprising movably mounted control surfaces secured to said fixed surfaces in position to be of maximum effectiveness in high speed forward flight, a control system comprising said rotative wings and means arranged for effective shifting movements of the rotor sustention thrust line with respect to the center of gravity of the craft and positioned to be fully effective for control purposes at minimum forward flight speed, and common control means connected to both of said systems for operating them in conjunction over the entire range of flight speeds, whereby maximum efficiency and maneuverability are maintained under all flight conditions.

EDWARD BURKE WILFORD.

DISCLAIMER

Re. 21,306.—*Edward Burke Wilford*, Merion Pa. AIRCRAFT. Patent dated December 19, 1939. Disclaimer filed October 3, 1944, by the patentee.

Hereby enters this disclaimer to claims 12, 13, and 14 of said patent.

[*Official Gazette November 14, 1944.*]